United States Patent Office 3,335,788
Patented Aug. 15, 1967

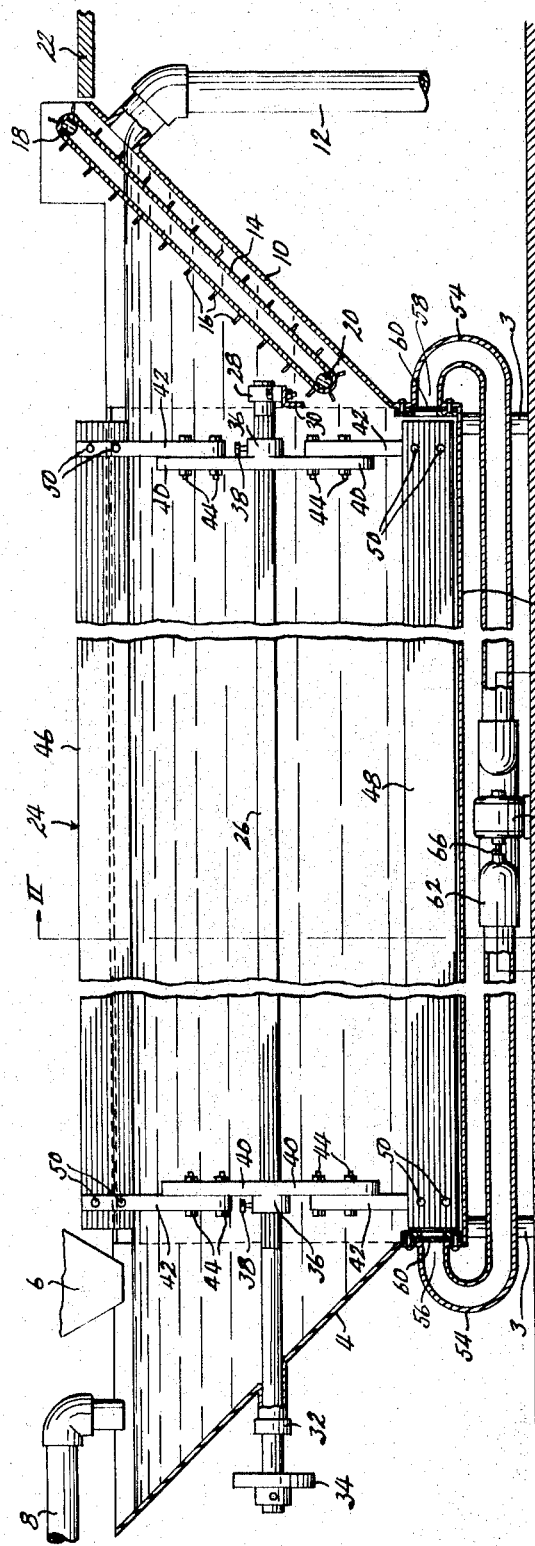

3,335,788
HEAT EXCHANGER FOR POULTRY AND THE LIKE
Ralph S. Zebarth, Kansas City, and Jack A. Furlong, Raytown, Mo., assignors to Ralph Zebarth, Inc., Kansas City, Mo., a corporation of Missouri
Filed July 23, 1965, Ser. No. 474,261
6 Claims. (Cl. 165—39)

ABSTRACT OF THE DISCLOSURE

This application discloses an apparatus for chilling poultry carcasses or other articles heavier than water; and consisting of an elongated tank adapted to contain a liquid coolant bath into which articles are inserted at one end of the tank and from which they are removed at the opposite end of the tank, means for establishing a current in said bath liquid flowing from the inlet end to the outlet end thereof, and agitator and lifting means disposed in said tank and operable to engage articles sinking to the lower portion of the tank, lift them to the top portion of the tank, and there to release them to again sink through said bath.

---

This invention relates to new and useful improvements in poultry processing equipment, and has particular reference to a device for either chilling or heating poultry carcasses or parts thereof. Freshly dressed poultry carcasses or parts thereof require chilling to remove body heat therefrom preparatory to freezing, packaging or otherwise further processing them for sale. On the other hand, dressed poultry is often frozen for storage, then later further processed as for example by deboning, grinding or the like, and of course must be heated and thawed before this processing is performed. The present device has been developed and designed particularly for use in treating poultry giblets, namely hearts, livers and gizzards, and will be so described, although it will be readily apparent that with minor adaptations as to size and capacity the device could be utilized for treating whole poultry carcasses and the like.

A popular type of poultry heat exchanger in very common usage includes a horizontally elongated tank containing a bath of water or other liquid of the desired temperature, the giblets to be treated being inserted into the bath at one end of the tank and removed at the other end after passing through the bath. The bath is agitated to insure thorough and intimate contact between the giblets or other parts, and the water, and the giblets are caused to travel the length of the tank by a current set up therein by adding fresh water continuously at the inlet end of the tank and overflowing it at the outlet end of the tank.

However, certain problems have arisen in connection with this type of device. Governmental regulations require the overflowing of, and hence the addition of, additive water at at least a minimum rate depending on the rate at which giblets are added, in order to avoid contamination of the bath by poultry blood and other body fluids. Also, poultry parts can be immersed in the bath for only a limited length of time in order to maintain the percentage of water absorption thereby below an allowable figure, also established by governmental regulations. For a given or average rate of adding giblets to the bath, it will thus be clear that the length and flow area of the tank may be computed and designed so that the addition of fresh water thereto at the required rate will establish a current which will transport the giblets through the tank within a time period long enough to provide the desired degree of temperature change, but short enough to avoid undue water absorption by the giblets. But the device will not then function efficiently or greater-than-average or less-than-average loading rates. On less-than-average loading rates, it is not economically feasible to maintain the addition of fresh water at the average-load rate, but if the water-addition rate is reduced to the rate actually required for the smaller load, the current in the tank will be slowed and the giblets will therefore remain in the tank too long and very possibly absorb more than the permissible amount of water. On the other hand, for greater-than-average loading rates the increased rate of adding fresh water will speed the water current in the tank, with the result that the giblets may be retained in the tank for too short a time to insure the desired degree of temperature change thereof.

Accordingly, the principal object of the present invention is the provision of a giblet heat exchanger of the character described having means for regulating the rate of travel of giblets through the tank, and hence the period of time they remain in the tank, by regulating the water current speed in the tank without affecting the rate at which fresh water is added to or overflowed from said tank. Thus the travel of the giblets is slowed during periods of greater-than-average rates of addition of giblets and fresh water, and is assisted or speeded during periods of less-than-average rates of addition of giblets and fresh water, to the end that the time the giblets remain in the tank may be equalized at all rates of addition of giblets and fresh water. Generally, this object is accomplished by means within the bath operable to remove water selectively from either end of the tank and to deliver it to the opposite end of said tank, by means separate from and not affecting the rate of addition and overflow of fresh make-up water, to the end that the effective current speed in the tank may be selectively either slower or speeded as may be required.

Another object is the provision of a heat exchanger of the character described having a conduit external to said tank and having its opposite ends interconnected respectively into the opposite ends of said tank, said conduit having a reversible, variable delivery pump mounted therein whereby water may be drawn from either end of the tank and delivered to the other end, at adjustable rates.

Still another object is the provision of a heat exchanger of the character described including an agitator operable within the tank and having the function of insuring that the giblets are retained in suspension in the water during most of their travel through the tank, in order that they may effectively be propelled by the flow of water in the bath. Giblets, as well as poultry carcasses and parts in general, are slightly nonbuoyant so that they tend to settle to the bottom of the tank and lodge there. Within practical limits even a very swift current could not insure travel of the giblets through the tank, said giblets on the contrary tending to settle into a stationary mass on the bottom of the tank. The present agitator mechanically elevates giblets which have settled to the tank bottom to the top of the tank, then releases them to settle slowly through the bath, so that they can effectively be propelled even by weak water currents.

Other objects are simplicity and economy of construction, efficiency and dependability of operation, and adaptability for use in chilling or heating many types of articles other than poultry or poultry giblets.

With these objects in view, as well as other objects which will appear in the course of the specification, reference will be had to the accompanying drawing wherein:

FIG. 1 is a foreshortened vertical midsectional view of a heat exchanger embodying the present invention, foreshortened and with parts left in elevation and partially broken away, FIG. 2 is a sectional view taken on line II—II of FIG. 1, and FIG. 3 is an enlarged, fragmentary sectional view taken on line III—III of FIG. 1.

Like reference numerals apply to similar parts throughout the several views, and the numeral 2 applies to the tank for containing the heat treating bath, the main central portion of said tank being a cylindrical cross-sectional contour, open at the top, and of any desired length. Said tank is supported by legs 3. It is provided at one end with an entry section 4 into which poultry parts or other articles to be treated are dropped from a hopper 6, and into which additive or makeup liquid is added constantly through a pipe 8. If the articles to be treated are poultry carcasses, giblets, or other parts, the liquid is water, either hot or cold depending on whether it is desired to heat or chill said articles. In the case of a chilling operation, the makeup additive may be a mixture of water and cracked ice. As has been mentioned previously, government regulations require the addition of makeup water at a rate determined by the rate which poultry parts are added, say a minimum of one gallon of water for each 100 sets of chicken giblets, in order to avoid harmful contamination of the bath by blood, body fluids and the like. It is of course not economical to add water at a rate greater than is actually required for this purpose.

The tank is provided at its opposite end with an exit section 10 fitted with an overflow pipe 12 through which water will overflow at the same rate it is added from pipe 8, the elevation of the overflow thus determining the depth of the water bath in tank 2. The exit section is also provided with a conveyor consisting of a flexible belt 14 having cleats 16 thereon and trained over a pair of rollers 18 and 20 carried rotatably by the tank, at least one of said rollers being rotatably driven by any suitable means, not shown. Said belt is so inclined as to receive articles on the lower portion thereof, and to elevate them above the liquid level of the tank and deposit them on a table 22, or on another conveyor to transport them to another station for further processing. It will be apparent from the structure thus far described, that the addition of water from pipe 8, and its overflow at pipe 12, will established a water current flowing from the inlet end of the tank to its outlet end, and that this current will carry articles deposited in the bath longitudinally through the tank, as long as said articles are maintained in suspension in the bath, as will be described.

Disposed coaxially within tank 2, and extending substantially the entire length of the cylindrical portion thereof, is a reel designated generally by the numeral 24. Said reel is mounted on a shaft 26 disposed coaxially in the tank, said shaft being shown as square except at its ends, one end being journalled in a bearing 28 mounted on a cross bar 30 extending across the outlet portion of the tank, and the other end being rotatably mounted in a bearing-stuffing box element 32 at the inlet end of the tank, extending outwardly from the tank and having a pulley 34 or the like at its outer end whereby it may be connected to and rotatably driven by any suitable power element, not shown.

Mounted nonrotatably on the squared portion of shaft 26, respectively adjacent the opposite ends of the cylindrical portion of the tank, are a pair of hubs 36, each hub being secured against sliding movement along the shaft by a set screw 38. Formed integrally with each hub are a pair of oppositely extending radial arms 40, and to each of said arms an arm extension 42 is affixed by a pair of bolts 44, said bolts being inserted selectively through various longitudinally spaced apart holes in said arms and arm extensions whereby to adjustably vary the combined radial extension of the arms and arm extensions. A pair of vanes 46 and 48, each consisting of a flat metal strip or the like, extend substantially the full length of the cylindrical portion of the tank in a direction parallel to shaft 26, and each is secured at its respective ends, as by rivets 50, to the other ends of a corresponding pair of arm extensions 42 of the two hubs 36. As will be seen in FIG. 2, the leading faces of the vanes as the reel is rotated in the direction of arrow 52, are radial to the reel axis.

Reel 24 functions to maintain poultry parts or other articles in suspension in the bath in order that they will be efficiently propelled by the water current therein. It should be understood that poultry giblets, carcasses and the like are slightly nonbuoyant in water, so as to sink slowly when deposited therein. In the present device, the poultry parts sinking to the bottom of the tank are immediately contacted by one of the vanes and elevated thereby along the side of the tank. The parts should of course not slip between the tank wall and the vanes, and for this reason the vane arms are made adjustable in length to accommodate parts of different sizes. For example, with giblets, which may be very small, the vanes must move in very close proximity to the tank wall, while for whole carcasses the spacing may be much wider. As each vane nears the top of its orbit, carrying its load of poultry parts, said parts fall away from the vane by gravity. In order to insure that the parts actually will fall away from the vanes, and not remain pressed thereagainst by water pressure caused by rotation of the reel, the water level is positioned at such an elevation that all, or at least a major portion, of each vane is elevated above said water level at the top of its orbit, so that all water pressure on the poultry parts carried by said vane is released and said parts must fall free. Were it not for this feature, and if the reel were completely submerged, poultry parts might be held against the vanes by the water pressure for an indefinitely long period of time, perhaps for many revolutions of the reel. As the poultry parts are released, they are of course suspended in the bath, and settle slowly therethrough to the bottom of the tank, where they are again picked up by a vane and started again through another like cycle. The suspension of the parts in the water insures a thorough, intimate, and constantly changing contact between said parts and said water, in order to insure a highly efficient heat exchanging function. Said suspension of the parts in the water insures also that the parts will be effectively propelled longitudinally through the tank by the current generated by the addition and overflow of makeup water as previously described, even though under some circumstances this current may be slow and gentle. As a matter of fact, it has been found that without some means for maintaining the poultry parts in suspension, even a very swift water current will not insure travel of the parts through the tank. On the contrary, said parts would then have a pronounced tendency to settle to the bottom of the tank into a solid, stationary mass. The present device, moreover, provides the suspension by a process of repetitive lifting and dropping, rather than by any process of relatively violent general stirring or agitation. This is an important feature also, since it permits a very slow, gentle agitation which will not bruise, skin or otherwise damage the poultry parts. Purely by way of example only, it has been found that in a tank of about four feet in diameter, a reel speed of about three or four revolutions per minute provides quite satisfactory results.

In addition, the present structure includes a pipe or other conduit 54 disposed beneath tank 2 externally thereto, the opposite ends of said pipe being interconnected into the tank respectively at or adjacent the inlet and outlet ends thereof, as shown, the connections being indicated by the numerals 56 and 58 respectively at the inlet and outlet ends of said tank. The openings of said pipe into the tank are covered by screens 60 to prevent the entry of poultry giblets or the like into the pipe. Intermediate its ends, pipe 54 has a pump housing 62 interconnected therein, having mounted therein an impeller type pump member 64 fixed on a shaft 66 which extends outwardly from housing 62 and is driven by an electric motor 68. Said motor is reversible, whereby to drive pump 64 in either direction to impel water in either direction through pipe 54. It is also a variable speed motor, or connected to pump 64 through a variable speed drive, whereby pump 64 may be driven at different speeds to deliver water at variable rates.

To understand the operation of pipe 54 and pump 64, it should first be appreciated that in any case the parts should remain in the bath for a substantially fixed length of time, long enough to provide the desired degree of cooling, or heating as the case may be, but still short enough to hold the water absorption by the parts below allowable limits. It will be apparent that for any given rate, and for the corresponding rate of adding makeup water from pipe 8, also established by regulations, the tank area and length could be designed so that the poultry parts would remain in the tank for the proper length of time, being propelled solely by the water current generated by the addition and overflow of water. However, if job conditions called for a greater loading rate, and consequently a higher rate of addition of water from pipe 8, the swifter current in the tank would move the parts through the tank in a shorter time, and the parts therefore would not be cooled, or heated, to the desired degree. If job conditions called for a less-than-average rate of insertion of poultry parts from hopper 6, and consequently a lower rate of addition of water from pipe 8, the resulting slower water current in the tank would retain the poultry parts therein for too long a time, so that they would absorb more than the allowable amount of moisture.

The present structure solves these difficulties in a novel manner, by providing means by which the effective speed of flow of the water current in the tank without changing the rate at which water is added at pipe 8 and overflowed at pipe 12. For example, at less-than-average rates of loading giblets to the tank from hopper 6, and for the consequently less-than-average rate of water addition from pipe 8, pump 64 is set in operation to draw water from the outlet end of the tank at connection 56, and deliver it through pipe 54 to the outlet end of the tank at connection 58, and deliver it through pipe 54 to the inlet end of the tank at connection 56. This speeds the effective current in the tank, so that giblets are transported therethrough in the same time span that would have resulted if relying solely on the current provided by the addition and overflow of fresh water at an average rate even though water is no longer being added at that rate. At greater-than-average rates of adding giblets and fresh water, pump 64 is set in operation to draw water from the inlet end of the tank at connection 56, and deliver it through pipe 54 to the outlet end of the tank at connection 58. This slows the effective current speed in the tank, so that giblets are still transported therethrough in the same time span that would have resulted if relying solely on the current provided by the addition and overflow of fresh water at an average rate, even though water is now being added at a higher rate. In this case, water should never be delivered by pump 64 at a rate greater than the rate at which water is added to the tank at pipe 8, since this could result in an actual reverse current in the tank, a condition which of course would have no useful purpose. For an "average" rate of addition of giblets and fresh water to the tank, assuming that the tank area and length were computed for such loading rate, pump 64 could be shut off, and reliance made solely on the current established by the addition and overflow of fresh water. Thus if pump 64 is properly set, both as to direction and rate of delivery, the giblets may be retained in the tank for the proper length of time, long enough to provide the desired temperature change but short enough to preclude undue absorption of water, regardless of the rate at which makeup water is added at pipe 8, even though still relying basically on the water current provided by said addition to propel said giblets through the bath.

Finally, it will be noted that as reel 24 is rotated, the ends of vanes 46 and 48 thereof pass in close proximity to the screens 60 guarding the connections 56 and 58 of pipe 54 to the tank. Thus they sweep said screens free of any poultry giblets or other articles which may have been drawn against either of said screens by the rush of water thereto. Any giblets so positioned could impede the flow of water through pipe 54 and thus reduce or entirely cancel the primary function of the pipe.

While we have shown and described a specific embodiment of our invention, it will be readily apparent that many minor changes of structure and operation could be made without departing from the spirit of the invention as defined by the scope of the appended claims.

What we claim as new and desire to protect by Letters Patent is:

1. An article heat exchanger comprising:
   (a) a horizontally elongated tank of generally curved cross sectional contour adapted to contain a bath of liquid at a temperature different from that of the articles to be treated, said tank having an article inlet at one end thereof and an article outlet at the opposite end thereof,
   (b) means for inserting articles to be treated into said bath at said inlet opening,
   (c) means for creating a current in said bath liquid to urge said articles from said inlet end toward said outlet end of said tank,
   (d) agitator and lifting means comprising a rotatable reel disposed coaxially in said tank for rotation about said axis and including longitudinal vanes generally extending parallel to the reel axis and passing in close proximity to the wall of said tank as said reel is rotated, said vanes having leading faces which are arranged generally radially to the axis of the reel whereby to engage and elevate articles from the lower to the upper portion of said tank as said reel is rotated,
   (e) means for rotatably driving said reel at a sufficiently low speed to allow articles elevated by said vanes to fall away from the leading face of each vane as said vane transverses the upper portion of its orbit, said current being effective to move said articles toward said outlet end of said tank as said articles fall away from said vanes in substantially dispersed condition and sink from the upper to the lower portions of said tank, and
   (f) means for removing said articles from said tank at the outlet end thereof.

2. A heat exchanger as recited in claim 1 whereby the liquid level in said tank is maintained at an elevation above the maximum transverse diameter of said tank but below the top of said reel, whereby a major portion of the leading face of each reel vane passes above said liquid level at the upper portion of its orbit, whereby to relieve articles against said face from liquid pressure urging them thereagainst, and hence to assist said articles in falling free of said face into said liquid bath.

3. A heat exchanger as recited in claim 1 wherein said current creating means comprises:
   (a) means for inserting additive liquid into said bath at the inlet end of said tank, said tank having an overflow opening at the outlet and thereof whereby the depth of the liquid bath is determined and maintained, said additive water creating a current in said bath,
   (b) a conduit external to said tank and having its opposite ends interconnected into said tank respectively adajcent the inlet and outlet ends thereof, and (c) a pump disposed in said conduit intermediate its ends and operable to impel liquid through said conduit toward the inlet end of said tank, whereby to increase the current in said tank to a higher speed than that supplied by the additive water.

4. A heat exchanger as recited in claim 3 wherein said pump is adjustable to impel liquid through said conduit at variable rates.

5. A heat exchanger as recited in claim 3 wherein said pump is reversible to impel liquid through said conduit selectively in either direction, whereby either to increase or decrease the unidirectional flow of current in said tank resulting from the addition of said additive liquid.

6. A heat exchanger as recited in claim 5 wherein said pump is adjustable to impel liquid through said conduit at variable rates.

References Cited

UNITED STATES PATENTS 1,733,992  10/1929  Grace _____ 165—97

FOREIGN PATENTS 902,522  8/1962  Great Britain.

ROBERT A. O'LEARY, *Primary Examiner.*

CHARLES SUKALO, *Examiner.*